L. S. BURBANK.
HOLDING AND DELIVERING MEANS FOR RING TRAVELERS.
APPLICATION FILED MAY 19, 1909.
928,303.
Patented July 20, 1909.
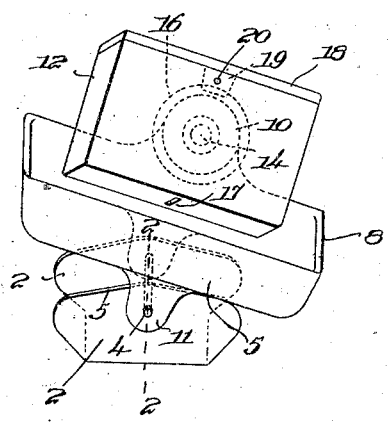
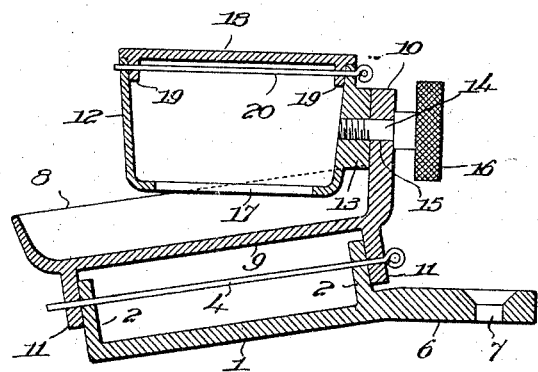
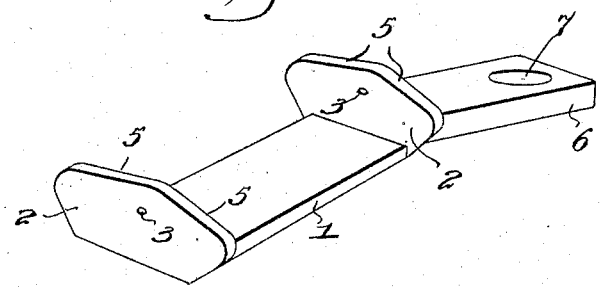
Witnesses,
Edward H. Allen.
Joseph M. Ward.
Inventor:
Louis S. Burbank,
by Crosby Gregory.
Attys.

UNITED STATES PATENT OFFICE.

LOUIS S. BURBANK, OF HOPEDALE, MASSACHUSETTS, ASSIGNOR TO DRAPER COMPANY, OF HOPEDALE, MASSACHUSETTS, A CORPORATION OF MAINE.

HOLDING AND DELIVERING MEANS FOR RING-TRAVELERS.

No. 928,303.  Specification of Letters Patent.  Patented July 20, 1909.

Application filed May 19, 1909. Serial No. 497,019.

*To all whom it may concern:*

Be it known that I, LOUIS S. BURBANK, a citizen of the United States, and a resident of Hopedale, county of Worcester, State of Massachusetts, have invented an Improvement in Holding and Delivering Means for Ring-Travelers, of which the following description, in connection with the accompanying drawing, is a specification, like characters on the drawing representing like parts.

This invention has for its object the production of a simple device for holding a supply of ring-travelers in bulk and for delivering a few at a time for use by the attendant, the travelers being used on the rings of spinning and twisting frames. These travelers are small pieces of bent wire or flat metal, of various sizes and shapes, and they are sprung onto the rings to guide the yarn as it leads to the spindle from the ring surrounding it. As the operator must from time to time replace broken or burned off travelers it is necessary that a supply of the travelers be kept in a convenient place, and when the travelers are left in an open box or other receptacle they are exposed to the entrance of dust and lint, and some of them are very apt to be wasted each time the operator has need of one. That is, in dipping the finger and thumb into the supply, intending to remove only one or two, it will frequently happen that quite a number will be withdrawn and those in excess may be dropped back into the receptacle but often they will shake off or drop onto the floor and are wasted.

My present invention comprehends a covered receptacle or holder to contain the reserve supply of travelers while protecting them from dust or dirt, and an open pan or cup into which a few of the travelers are delivered from a suitable outlet orifice in the said holding receptacle.

The receptacle and pan are rigidly connected, the pan extending beneath the outlet orifice of the said receptacle, and said connected parts are pivotally mounted on a suitable support so that by oscillating or rocking the receptacle and pan a few travelers will be separated from the mass and discharged into the pan. Said pan is open and relatively shallow, so that the operator can easily withdraw therefrom the travelers one by one as they are required. Thus waste is prevented, and the ease with which the single travelers can be picked up simplifies the work of the operator.

The various novel features of my invention will be fully described in the subjoined specification and particularly pointed out in the following claims.

Figure 1 is an outer end elevation of traveler holding and delivering means embodying one form of my invention, the holder and connected pan being shown in normal position; Fig. 2 is a central longitudinal section on the line 2—2, Fig. 1, but showing the holder and pan in mid-position; Fig. 3 is a perspective view of the support, detached.

In Fig. 3 the support 1 has upturned parallel ends 2, provided with holes 3 for a pivot-pin 4, Fig. 2, the top edges of the ends being oppositely sloped, as at 5, 5, from the central and highest point of such ends, an ear 6 extending from the rear end of the support having a hole 7 for a screw by means of which said support is rigidly attached to some convenient fixed part of the spinning or twisting frame.

As shown in Fig. 2 the support is slightly inclined with relation to the attaching ear 6, the latter in practice being substantially horizontal when in place on the frame. An elongated, relatively shallow open pan 8, having a flat bottom 9, and an upturned ear 10 at its inner end, is provided with depending lugs 11 which receive between them the ends 2 of the support, said lugs being apertured to receive the pivot-pin 4 by means of which the pan is pivotally connected with the support.

The flat bottom of the pan will normally rest upon the sloping faces 5 at one or the other side of the pivot, as shown in Fig. 1, but the pan can be rocked manually about the pin 4 as a fulcrum and will rest at one or the other side thereof when released, as will be obvious, causing the pan bottom to be inclined longitudinally and also laterally. Into this pan the travelers are delivered a few at a time from the holder 12, shown as a substantially rectangular box or case provided on one end with an external boss 13 threaded to receive a shouldered screw-stud 14, clearly shown in Fig. 2, passed through a hole 15 in the ear 10. The screw-stud has a milled or other suitable head 16 by which it can be set up to fixedly connect the holder and pan, as will be seen from an inspection of Fig. 2, and as the ear 10 is preferably made substantially vertical the holder will be held in a horizontal position, overhanging the pan 8, as shown. An elongated slot or outlet orifice 17 is made in the bottom of the holder, its width depending upon the size of the travelers to be handled, small travelers requiring a narrower orifice than large ones. A removable cover 18 is provided for the holder, having apertured, depending lugs 19 to enter the holder and to receive a retaining pin or wire 20, passed through opposite holes in the walls of the holder.

In the use of the device the cover is removed and the loose travelers are dropped into the holder 12 to conveniently fill it, after which the cover is replaced and locked by the pin 20.

The shaking or jarring of the spinning or other frame will tend to settle the mass of travelers, and from time to time one or two may possibly be shaken out through the orifice 17, dropping into the pan, but this agitation is generally insufficient to provide enough travelers for use. When others are needed, therefore, the attendant grasps the pan or holder and quickly rocks said connected parts on the fulcrum pin 4. The travelers in the holder will thereby be well shaken about and thrown from side to side of the holder, and if they have chained or become hooked together this relatively violent agitation will shake loose some from the chains so that they can escape into the pan through the outlet orifice 17.

At best only a few of the travelers will pass out at any one time, so that in the pan there will be anywhere from one or two up to eight or ten travelers, so that the opportunity for waste is practically eliminated.

The pan is shallow, yet deep enough to retain the travelers delivered thereto from the holder, and as the pan slopes or is inclined toward its outer end the travelers will slide down into convenient position for removal by the attendant.

The holder, pan, and support are made as castings, very little finishing is required, and the assembling of the parts is easily and quickly effected.

As the normal position of the pan and holder is shown in Fig. 1, at one or the other side of the fulcrum on which said parts rock, the reserve supply of travelers in the holder will be held at one side of the orifice 17, unless the holder is very full, so that the jarring of the frame is not enough to provide the pan with travelers ready for use.

By providing a set of holders having outlet orifices of different sizes the holders can be changed to accommodate holders of various sizes, the screw-stud 14 providing a detachable connection between the holder and the pan.

Having fully described my invention, what I claim as new and desire to secure by Letters Patent is:—

1. The combination with a support adapted to be rigidly attached to a ring-frame, and a shallow open pan pivotally mounted on the support to be rocked thereupon, of a traveler holder fixedly connected with and overhanging the pan and having an outlet orifice in its bottom above said pan, and a removable cover for the open top of the holder, the normal position of the pan and holder causing the travelers in the latter to collect at one side of the outlet orifice.

2. The combination, with a longitudinally inclined support, of an open pan pivotally mounted thereon to be rocked from side to side, means to limit such rocking movement, and a traveler holder fixedly connected with and located above the pan and having an outlet through which travelers are delivered to the pan, the inclination of the pan on the support causing travelers therein to slide down to its lower, front end.

3. A box-like traveler holder having a narrow delivery orifice in its bottom, a removable cover for the holder, a shallow flat-bottomed pan extended beneath the holder and connected therewith, into which the travelers drop as delivered, a support having upturned ends oppositely inclined at their upper edges, and a pivotal connection between the pan and said ends, the bottom of the pan normally resting in inclined position on the upper edges of the ends of the support at one side of the pivotal connection.

4. Means for holding and delivering ring-travelers, comprising a holder to receive travelers in bulk and having an outlet orifice, a pan fixedly connected with the holder and extended beneath it to receive travelers delivered therefrom through the outlet orifice, a fixed support on which the pan and holder are pivoted to rock in unison, and means to limit such rocking movement and normally maintain the holder in position and prevent escape of the travelers.

5. The combination, with a support, of an open pan, a holder detachably connected therewith to move normally in unison with the pan and having an outlet orifice above the pan, and a pivotal connection between the connected pan and holder and said support, whereby said pan and holder may be rocked in unison relatively to the support, the normal position of the pan and holder causing the travelers in the latter to collect at one side of the outlet orifice.

In testimony whereof, I have signed my name to this specification, in the presence of two subscribing witnesses.

LOUIS S. BURBANK.

Witnesses:
ALBERT C. RHODES,
E. D. OSGOOD.